US008903906B2

(12) United States Patent
Inoue

(10) Patent No.: US 8,903,906 B2
(45) Date of Patent: Dec. 2, 2014

(54) INFORMATION COMMUNICATIONS SYSTEM, NODE DEVICE, METHOD OF COMMUNICATING CONTENTS, COMPUTER READABLE RECORDING MEDIUM STORING A PROGRAM

(75) Inventor: Takuya Inoue, Toukai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 400 days.

(21) Appl. No.: 13/047,351

(22) Filed: Mar. 14, 2011

(65) Prior Publication Data

US 2011/0231490 A1   Sep. 22, 2011

(30) Foreign Application Priority Data

Mar. 16, 2010   (JP) ................. 2010-058933
Mar. 16, 2010   (JP) ................. 2010-058934

(51) Int. Cl.
  *G06F 15/16*   (2006.01)
  *H04L 29/08*   (2006.01)

(52) U.S. Cl.
  CPC ...... *H04L 67/1065* (2013.01); *H04L 29/08729* (2013.01); *H04L 67/1095* (2013.01); *H04L 67/1097* (2013.01)
  USPC ........................................................ 709/204

(58) Field of Classification Search
  None
  See application file for complete search history.

(56) References Cited

U.S. PATENT DOCUMENTS

| | | | | |
|---|---|---|---|---|
| 5,450,584 A | * | 9/1995 | Sekiguchi et al. | 707/782 |
| 6,826,598 B1 | * | 11/2004 | Titmuss et al. | 709/212 |
| 7,155,587 B2 | * | 12/2006 | Eguchi et al. | 711/162 |
| 7,181,578 B1 | * | 2/2007 | Guha et al. | 711/154 |
| 7,194,532 B2 | | 3/2007 | Sazawa et al. | |
| 7,653,689 B1 | * | 1/2010 | Champagne et al. | 709/206 |
| 7,885,928 B2 | * | 2/2011 | Harrington et al. | 707/637 |
| 8,126,914 B2 | * | 2/2012 | Tate et al. | 707/781 |
| 2003/0131068 A1 | * | 7/2003 | Hoshino et al. | 709/216 |
| 2003/0167295 A1 | * | 9/2003 | Choo | 709/104 |
| 2005/0021575 A1 | * | 1/2005 | Boyd et al. | 707/205 |
| 2006/0031537 A1 | * | 2/2006 | Boutboul et al. | 709/228 |
| 2006/0059248 A1 | | 3/2006 | Ikeda | |
| 2006/0218127 A1 | * | 9/2006 | Tate et al. | 707/3 |
| 2007/0283043 A1 | | 12/2007 | Kiyohara et al. | |

(Continued)

FOREIGN PATENT DOCUMENTS

JP   A-2-93836   4/1990
JP   A-2003-323329   11/2003

(Continued)

OTHER PUBLICATIONS

Office Action issued in Japanese Patent Application No. 2010-058933 dated Jul. 17, 2012 (with translation).

(Continued)

*Primary Examiner* — Shirley Zhang
(74) *Attorney, Agent, or Firm* — Oliff PLC

(57) ABSTRACT

An information communications system for an overlay network includes: a plurality of node devices which are connected to each other through a network and constitute the overlay network, contents being distributed and stored in the plurality of node devices, the plurality of node devices including a contents source transmitting contents to other node devices. The plurality of node devices includes a first node device including: a contents storage unit configured to store the contents; and a limiting unit configured to limit uploading of the contents stored in the contents storage unit,

18 Claims, 9 Drawing Sheets

(56) References Cited

U.S. PATENT DOCUMENTS

| | | | |
|---|---|---|---|
| 2008/0059746 A1* | 3/2008 | Fisher | 711/165 |
| 2008/0126673 A1* | 5/2008 | Kaneda | 711/103 |
| 2009/0094347 A1* | 4/2009 | Ting et al. | 709/219 |
| 2009/0100128 A1* | 4/2009 | Czechowski et al. | 709/203 |
| 2009/0271412 A1* | 10/2009 | Lacapra et al. | 707/10 |
| 2010/0023489 A1* | 1/2010 | Miyata et al. | 707/3 |
| 2010/0146138 A1* | 6/2010 | Ng et al. | 709/231 |
| 2010/0223436 A1 | 9/2010 | Yamagishi et al. | |
| 2011/0282945 A1* | 11/2011 | Thyni et al. | 709/204 |
| 2012/0042138 A1* | 2/2012 | Eguchi et al. | 711/154 |
| 2012/0197962 A1* | 8/2012 | Maenpaa et al. | 709/201 |

FOREIGN PATENT DOCUMENTS

| | | |
|---|---|---|
| JP | A-2004-64284 | 2/2004 |
| JP | A-2004-118249 | 4/2004 |
| JP | A-2006-72432 | 3/2006 |
| JP | A-2006-197400 | 7/2006 |
| JP | A-2006-323703 | 11/2006 |
| JP | A-2007-274443 | 10/2007 |
| JP | A-2008-11147 | 1/2008 |
| JP | A-2008-92236 | 4/2008 |
| JP | A-2008-236536 | 10/2008 |
| JP | A-2008-304982 | 12/2008 |
| JP | A-2009-31898 | 2/2009 |
| JP | A-2009-98817 | 5/2009 |
| JP | A-2009-230583 | 10/2009 |

OTHER PUBLICATIONS

Office Action issued in Japanese Patent Application No. 2010-058934 dated Jul. 10, 2012 (with translation).

Feb. 12, 2013 Office Action issued in Japanese Patent Application No. 2010-058933 (with translation).

* cited by examiner

US 8,903,906 B2

INFORMATION COMMUNICATIONS SYSTEM, NODE DEVICE, METHOD OF COMMUNICATING CONTENTS, COMPUTER READABLE RECORDING MEDIUM STORING A PROGRAM

CROSS-REFERENCE OF APPLICATION

This application is based upon and claims the benefit of priority of Japanese Patent Application No. 2010-058933 filed on Mar. 16, 2010 and Japanese Patent Application No. 2010-058934 filed on Mar. 16, 2010, the contents of which are incorporated herein by reference in its entirety.

BACKGROUND

The present disclosure relates to a communication system having plural node devices which can communicate with each other through a network.

Recently, a peer-to-peer communication system is known. In the peer-to-peer communication system, when a node device acquires contents, for example, a node device storing the requested contents transmits the contents to the node device requesting the contents.

SUMMARY

However, for example, since a node device storing contents with high popularity is frequently asked for the contents by other node devices, the node device has to frequently transmit the contents every time. In this way, a specific node device may concentrically transmit contents. In this case, the amount of data to be transmitted from the specific node device increases. To cope with this situation, telecommunications carriers such as an ISP (Internet Service Provider) providing a network access service need to invest in additional equipment such as communication lines.

An aspect of the disclosure is to provide an information communications system, a node device, an information communications method, and a recording medium having a program recorded thereon, which can prevent contents from being transmitted excessively from a specific node device.

The aspect of the disclosure provides the following arrangements.

An information communications system for an overlay network comprising:

a plurality of node devices which are connected to each other through a network and constitute the overlay network, contents being distributed and stored in the plurality of node devices, the plurality of node devices including a contents source transmitting contents to other node devices, wherein the plurality of node devices includes a first node device including:

a contents storage unit configured to store the contents; and a limiting unit configured to limit uploading of the contents stored in the contents storage unit.

A node device in an information communications system for an overlay network, the information communications system including a plurality of node devices which are connected to each other through a network and constitute the overlay network, contents being distributed and stored in the plurality of node devices, the plurality of node devices including a contents source transmitting contents to other node devices, the node device comprising:

a contents storage unit configured to store the contents; and a limiting unit configured to limit uploading of the contents stored in the contents storage unit.

A method of communicating contents which are distributed and stored in a plurality of node devices which are connected to each other and constitutes an overlay network, the contents being transmitted among the plurality of node devise, the method comprising:

storing the contents in one of the plurality of node devices; and limiting uploading of the stored contents from the one of the plurality of node devices.

A computer readable recording medium storing a program to be installed in a node device in an information communications system for an overlay network, the information communications system including a plurality of node devices which are connected to each other through a network and constitute the overlay network, contents being distributed and stored in the plurality of node devices, the plurality of node devices including a contents source transmitting contents to other node devices, in the case the program is installed in the node device, the program causing the node device to execute:

storing the contents in the node devices; and limiting uploading of the stored contents from the node devices.

DESCRIPTION OF EXEMPLARY EMBODIMENTS

Hereinafter, exemplary embodiments will be described with reference to the accompanying drawings. In the following embodiments, the invention is applied to a contents distribution and storage system. Hereinafter, a first embodiment will be first described.

First Embodiment

1. Configuration and Operation of Contents Distribution and Storage System

Figure 1:
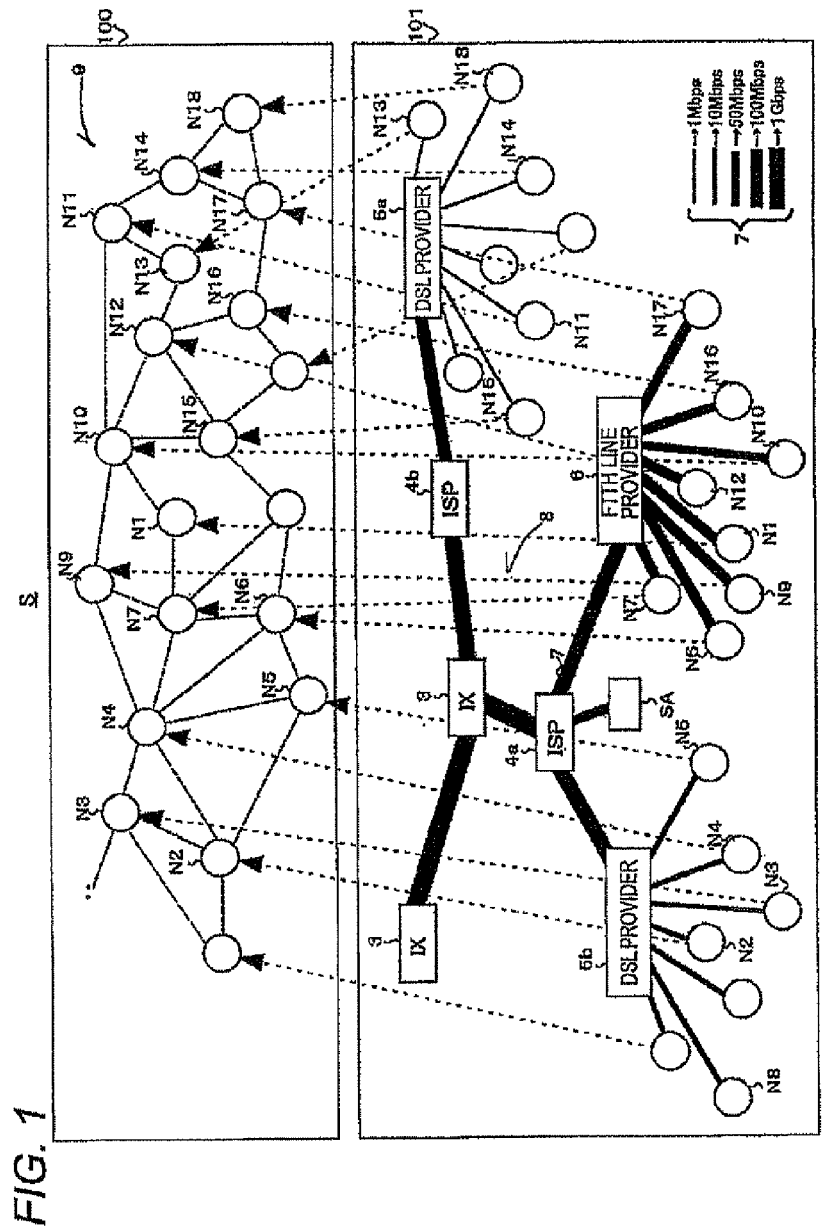
FIG. 1 is a diagram illustrating an example where node devices are connected to each other in a contents distribution and storage system S according to a first embodiment.

The configuration and operation of a contents distribution and storage system according to a first embodiment will be first described with reference to FIG. 1. FIG. 1 shows a specific configuration 101 and a conceptual configuration 100 of the contents distribution and storage system S. As shown in the specific configuration 101 of the contents distribution and storage system S, the contents distribution and storage system S includes plural node devices Nn (where n=1, 2, 3, ... ).

As shown in the specific configuration 101 of FIG. 1, the contents distribution and storage system S has a configuration in which plural node devices Nn are connected to each other through the Internet. As shown in the lower frame 101 of FIG. 1, a network 8 such as the Internet is constructed by IXs (Internet eXchangers) 3, ISPs (Internet Service Providers) 4*a* and 4*b*, equipment of DSL (Digital Subscriber Line) providers 5*a* and 5*b*, equipment of FTTH (Fiber to The Home) line providers 6, and communications lines 7. The network 8 is a communication network in the real world. Routers for transferring data packets are properly inserted in the network 8 shown in FIG. 1, but are not shown in FIG. 1. For example, phone lines or optical cables are used as the communication lines 7.

Plural node devices Nn (where n=1, 2, 3, ...) are connected to the network 8. Hereinafter, the node devices are referred to as "nodes". A unique production number and a unique IP (Internet Protocol) address are assigned to each node. The contents distribution and storage system S according to the first embodiment is a peer-to-peer network system in which some nodes among the nodes are connected to each other as shown in the conceptual configuration 100 of FIG. 1.

A network 9 shown in the conceptual configuration 100 of FIG. 1 is an overlay network 9 constructing a virtual link formed by the existing network 8. The overlay network 9 which is a logical network is embodied by a specific algorithm such as an algorithm using DHT. Node IDs which are unique identification information including a predetermined number of digits are assigned to the nodes Nn connected to the contents distribution and storage system S.

The connection to the contents distribution and storage system S is carried out by causing a non-connected node, for example, node N8, to transmit an entry message indicating an entry request into the contents distribution and storage system to a connected arbitrary node Nn. The entry into the contents distribution and storage system S means that the node is connected to the contents distribution and storage system S and can acquire contents data from the contents distribution and storage system S. The arbitrary node is, for example, a contact node always connected to the system S.

Each node includes a routing table using DHT. The routing table defines destinations of various messages in the contents distribution and storage system S. Specifically, plural pieces of node information including node IDs, IP addresses, and port numbers of the nodes properly separated in an ID space are registered in the routing table. A node connected to the contents distribution and storage system S stores the node information of the least necessary nodes in the routing table. By transferring various messages between the nodes, the node information of the nodes not storing the node information is acquired.

The contents distribution and storage system S distributes and stores replicas of various contents data having different contents in predetermined file formats in the plural nodes. Hereinafter, the contents data is referred to as "contents". The replicas can be used among the nodes. The originals of the contents are stored in a center server SA. A node storing the replicas of the contents is referred to as a "contents holding node". In the following description, the original and the replica of contents are both referred to as "contents" without particularly distinguishing them.

Information such as contents name and contents ID which is unique identification information of the contents is added to the contents. The location of the contents distributed and stored is stored in a node managing (storing) the location of the contents as index information. Hereinafter, the node managing (storing) the location of the contents is referred to as a "root node". The index information includes a set of the node information of the nodes storing the contents, the contents ID of the contents, and the like. The root node is determined, for example, to be a node having a node ID closest to the contents ID. The node ID closest to the contents ID is, for example, a node ID whose high-order digits are most equal to those of the contents ID.

When a user of a node wants to acquire desired contents, the node from which the user wants to acquire the contents generates a message. Hereinafter, the node from which the user wants to acquire contents is referred to as a "user node". This message is a search message including the contents ID of the contents to be acquired and the IP address of the user node. The search message is a message used to search for a contents holding node. The search message is sent to other nodes on the basis of the routing table using DHT acquired by the user node. That is, the user node sends out the search message to the root node. Accordingly, the search message finally arrives at the root node by the DHT routing using the contents ID as a key.

In each node, attribute information such as the contents name and the contents ID of the contents is described in contents catalog information. The contents catalog information is prepared by the center server SA and is transmitted to all the nodes Nn. The DHT routing is disclosed in Japanese Unexamined Patent Application Publication No. 2006-197400 and is not therefore described in detail.

The root node having received the search message acquires index information corresponding to the contents ID included therein from an index information cache. The acquired index information is returned to the user node as the transmitting source of the search message. The user node having acquired the index information can download (acquire) the contents on the basis of the index information. The user node transmits a contents request message to the contents holding node on the basis of the IP address and the port number of the contents holding node included in the index information. The contents request message includes the contents ID of the contents to be acquired. The contents holding node having received the contents request message transmits (uploads) the contents corresponding to the contents ID included in the contents request message to the user node. In this way, the user node can download the contents. The index information may include node information of plural contents holding nodes. In this case, the user node selects one contents holding node from the plural contents holding nodes. The user load can access the selected contents holding node and download the contents therefrom.

The root node may transmit a contents transmitting request message to the contents holding node indicated by the IP address included in the index information. Accordingly, the user node can download the contents from the contents holding node. The user node may acquire the index information from a cache node caching the same index information as the root node until the search message arrives at the root node.

When the user node acquires the contents from the contents holding node and stores the acquired contents, the user node generates a publication message. The publication message is a message used to inform the root node that the contents are stored. The publication message includes the contents ID of the contents and the node information of the node storing the contents. The publication message is sent to the root node. Accordingly, the publication message is made to arrive at the root node by the DHT routing using the contents ID as a key like the search message. The root node receives the publication message. The root node stores the index information including the set of the node information and the contents ID included in the publication message in an index information cache area. In this way, the user node becomes a new contents holding node holding the contents.

2. Limitation (1) of Amount of Contents Data to be Uploaded

Figure 2:
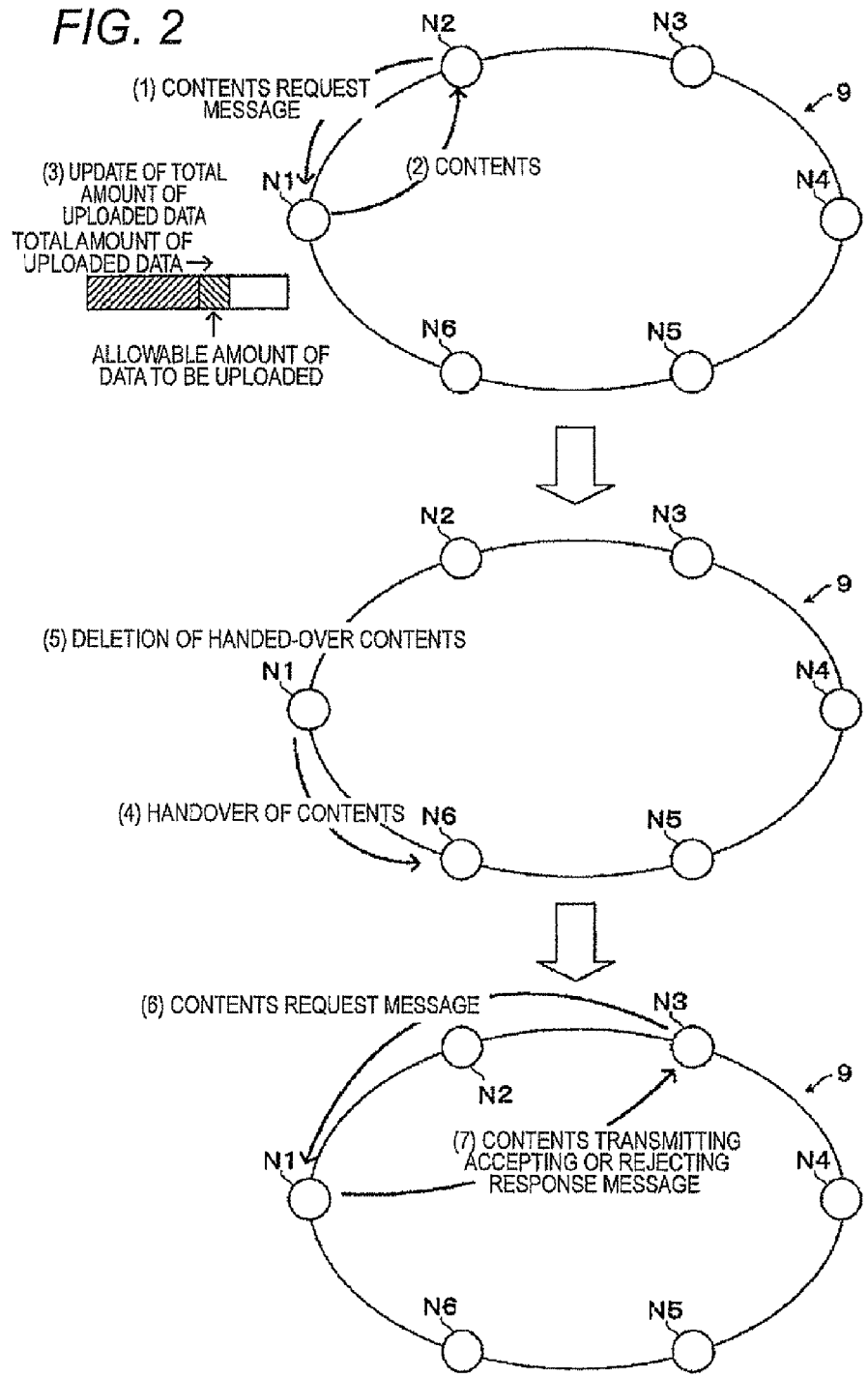
FIG. 2 is a diagram schematically illustrating operations in the contents distribution and storage system S according to the first embodiment.

FIG. 2 is a diagram illustrating an example where the contents are inhibited from being uploaded by a node in the first embodiment. The contents distribution and storage system S is constructed so that each node does not excessively upload contents to other nodes. More specifically, when the total amount of data uploaded for a counting period is greater than an allowable amount of data to be uploaded which is a predetermined threshold value, the node inhibits itself from uploading contents. The total amount of uploaded data is the total sum of amounts of contents data uploaded to other nodes. The allowable amount of data to be uploaded is set in advance, for example, for each node. For example, when an absolute upper limit by which one or more contents data should not be uploaded is set, the allowable amount of data to be uploaded is set to a value smaller than the absolute upper limit. The counting period is a period as a unit period in calculating the total amount of uploaded data. The total sum of the amounts of contents data uploaded for a certain counting period is the total amount of uploaded data for the counting period. The counting period is set in advance, for example, for each node Nn. The counting period is, for example, a period with a length of 1 day or a period with a length of 1 hour.

Specifically, as shown in FIG. 2, for example, node N2 as a user node transmits a contents request message to, for example, node N1 as a contents holding node (see (1) of FIG. 2). At this time, since the total amount of uploaded data is not greater than the allowable amount of data to be uploaded, node N1 uploads the contents to node N2 (see (2) of FIG. 2). Node N1 acquires the amount of data of the uploaded contents. Then, node N1 updates the total amount of uploaded data by adding the acquired amount of data to the total amount of uploaded data (see (3) of FIG. 2).

At this time, it is assumed that the total amount of uploaded data is greater than the allowable amount of data to be uploaded. Then, node N1 hands over one or more pieces of contents out of the contents stored in node N1 (see (4) of FIG. 2). The handover of contents means that a new contents holding node instead of the contents holding node is allowed to transmit the contents stored in the original contents holding node. The handover of contents is carried out to prevent the increase in uploading load of other nodes because the number of nodes capable of uploading the contents is reduced due to the inhibition of the uploading of contents. Specifically, in the example shown in FIG. 2, node N1 transmits the contents to be handed over, for example, to node N6. Node N6 having received the contents stores the received contents and transmits a publication message. On the other hand, node N1 deletes the handed-over contents (see (5) of FIG. 2). The amount of data able to be handed over is set in advance as an allowable amount data to be handed over. For example, when the above-mentioned absolute upper limit exists, the allowable amount of data to be handed over is set so that the total sum of the allowable amount of data to be uploaded and the allowable amount of data to be handed over is equal to or less than the absolute upper limit.

After the handover of contents is ended, node N1 inhibits the uploading of contents from node N1 itself for the current counting period. Specifically, it is assumed that node N1 receives a contents request message, for example, from node N3 (see (6) of FIG. 2). Then, node N1 transmits a contents transmitting rejecting message to node N3 instead of uploading contents (see (7) of FIG. 2). Node N1 is allowed to download contents from other nodes even while the uploading of contents is inhibited. Node N3 recognizes that it cannot download contents from node N1, by receiving the contents transmitting rejecting message. Therefore, node N3 downloads the contents from another node Nn.

Thereafter, when the counting period is ended, a new counting period is started. Then, node N1 resets the total amount of uploaded data to zero and releases the inhibition of the uploading of contents. Accordingly, when receiving a contents request message, node N1 can upload contents. The amount of contents stored in node N1 becomes smaller than that before inhibiting the uploading, because the handed-over contents are deleted. Accordingly, the possibility that the total amount of uploaded data would be greater than the allowable amount of data to be uploaded in the new counting period is lowered.

Various criteria for selecting contents to be handed over in (5) of FIG. 2 can be considered. Several criteria described below may be combined. For example, contents belonging to a predetermined type may be preferentially selected as the contents to be handed over. The types of contents are described, for example, as contents types in catalog information or may be added to the contents as contents types. The contents types added to the contents are stored in nodes, for example, in correlation with the contents. The types of contents can include, for example, moving image, music, still image, and electronic documents. A type of contents having an amount of data generally greater than the other types of contents or a type of contents having a tendency to be downloaded more frequently than the other types of contents is preferentially selected as the contents to be handed over. The contents may be classified into push-type contents and on-demand-type contents. The push-type contents are contents to be automatically downloaded by the nodes even without transmitting a contents request message, that is, even when it is not clearly requested by the user of the node. The push-type contents are contents which will be finally acquired by all the nodes. The on-demand-type contents are contents to firstly be uploaded in response to the transmitting of a contents request message. The on-demand-type contents are contents which are acquired by only necessary nodes. For example, when it is considered that the push-type contents needs more nodes than the on-demand-type contents, the push-type contents may be preferentially selected as the contents to be handed over. On the other hand, when it is considered that the push-type contents should not be basically uploaded after they are spread to all the nodes once, the on-demand-type contents may be preferentially selected as the contents to be handed over.

Contents with a higher degree of popularity may be preferentially selected as the contents to be handed over. The degree of popularity of contents is information indicating how popular the contents are. The higher degree of popularity means the higher possibility of downloading the contents. The degree of popularity is set in advance, for example, on the basis of a preliminary survey and the like. The degree of popularity may be set in advance for each contents or may be added to the contents. The degree of popularity of contents may be lowered every downloading. As the number of downloading times becomes greater, it means that the contents are spread to more nodes and thus the number of post-downloading times is lowered. That is, it is thought that the popularity of the contents is lowered as the number of downloading times is raised. In this case, for example, when a node uploads contents, the node subtracts, for example, a predetermined value from the degree of popularity added to the contents.

Then, the node adds the lowered degree of popularity to the contents and uploads the contents. On the contrary, the degree of popularity of contents may be set to be raised every downloading. In this case, it is thought that contents having a higher number of downloading times have a higher degree of popularity.

Contents having a higher uploading frequency may be preferentially selected as the contents to be handed over. For example, a node updates a contents transmitting history whenever uploading contents. For example, the contents ID of the uploaded contents, the uploading time, and the like are recorded in the contents transmitting history in correlation with each other. Then, the node calculates the number of uploading times for a predetermined period from the current time to a past time on the basis of the contents transmitting history for every contents. The node uses the calculated number of uploading times as the uploading frequency.

As an uploading time of contents becomes closer to the current time, that is, as the uploading time of contents becomes later, the contents may be preferentially selected as the contents to be handed over. The latest contents to be requested for uploading have a high possibility to be requested. The uploading time can be acquired, for example, from the above-mentioned contents transmitting history.

Contents having a larger amount of data may be preferentially selected as the contents to be handed over. The load of a node for uploading the contents having a larger amount of data increases. Accordingly, by allowing the number of nodes storing contents having large amounts of contents not to decrease, it is possible to reduce the loads of the nodes.

3. Configurations and Functions of Devices

The configurations and functions of the devices will be described with reference to FIGS. 3 and 4.

3.1. Configuration of Center Server SA

Figure 3:
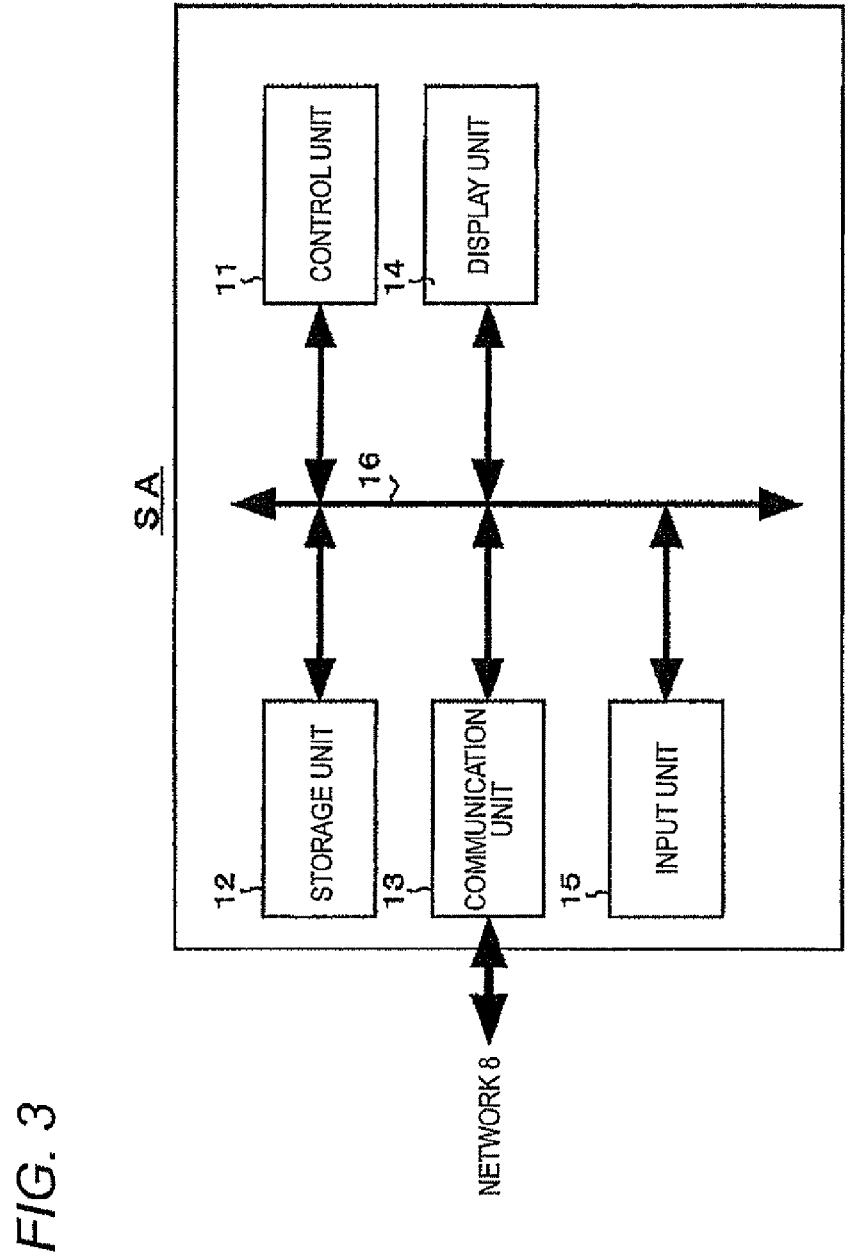
FIG. 3 is a diagram schematically illustrating the configuration of a center server SA.

The center server SA includes a control unit 11 as shown in FIG. 3. The control unit 11 includes a CPU having a calculation function, a working RAM, and a ROM storing various data and programs. The center server SA includes a storage unit 12 having an HD storing various data and various programs. The center server SA further includes a communication unit 13 controlling the communication of information between nodes Nn through the network 8. The center server SA further includes a display unit 14 formed of a CRT, a liquid crystal display, or the like displaying a variety of information. The center server SA further includes an input unit 15 receiving an instruction from an operator and supplying an instruction signal corresponding to the instruction to the control unit 11. The input unit 15 includes, for example, a keyboard or a mouse. The control unit 11, the storage unit 12, the communication unit 13, the display unit 14, and the input unit 15 are connected to each other through a bus 16.

Node IDs, IP addresses, and port numbers of the nodes are stored in the storage unit 12. The control unit 11 comprehensively controls the center server SA by causing the CPU to read and execute programs stored in the storage unit 12 and the like.

3.2. Configuration of Node

Figure 4:
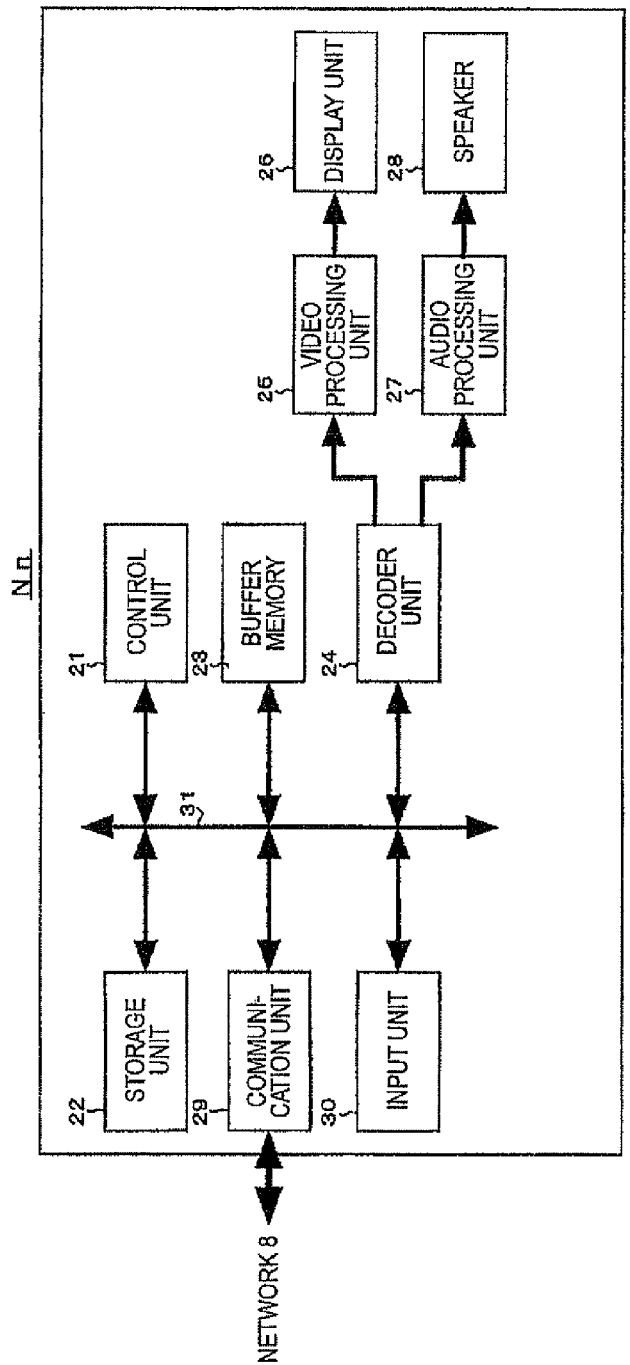
FIG. 4 is a diagram schematically illustrating the configuration of a node.

Each node includes a control unit 21 as a computer as shown in FIG. 4. The control unit 21 includes a CPU having a calculation function, a working RAM, and a ROM storing various data and programs. Each node further includes a storage unit 22 and a buffer memory 23. The storage unit 22 is constructed by an HD (Hard Disk) storing various data and various programs. The buffer memory 23 temporarily stores replicas of received contents. Each node further includes a decoder unit 24. The decoder unit 24 decodes encoded video data (video information) and audio data (audio information) included in a replica of contents. Each node further includes a video processing unit 25 and a display unit 26. The video processing unit 25 performs a predetermined drawing process on the video data or the like decoded by the decoder unit 24 and outputs a video signal. The display unit 26 includes a CRT or a liquid crystal display displaying a video on the basis of the video signal output from the video processing unit 25. Each node further includes an audio processing unit 27 and a speaker 28. The audio processing unit 27 converts the decoded audio data into an analog audio signal in a D/A (Digital/Analog) conversion manner, and amplifies and outputs the resultant signal. The speaker 28 outputs the audio signal output from the audio processing unit 27 as sound waves. Each node further includes a communication unit 29. The communication unit 29 controls the communication of information with other nodes through the network 8. Each node further includes an input unit 30. The input unit 30 receives an instruction from a user and supplies an instruction signal corresponding to the received instruction to the control unit 21. The input unit 30 includes, for example, a keyboard, a mouse, a remote controller, or an operation panel. The control unit 21, the storage unit 22, the buffer memory 23, the decoder unit 24, the communication unit 29, and the input unit 30 are connected to each other through a bus 31.

The storage unit 22 stores the routing table using DHT, the index information, the address information of a contact node serving as an access destination at the time of entering the contents distribution and storage system S, and the address information of the center server SA. The storage unit 22 also stores downloaded contents in correlation with the contents IDs. In addition, the storage unit 22 stores information such as the allowable amount of data to be uploaded, the allowable amount of data to be handed over, the total amount of data uploaded at the current time, and the contents transmitting history.

The storage unit 22 stores various programs such as an operating system and P2P software. For example, the P2P software includes the program according to the exemplary embodiment. The P2P software is software connected to the overlay network 9 to communicate with other nodes. The P2P software may be downloaded, from the center server SA. The P2P software may be recorded, for example, on a recording medium and may be read from the recording medium by the use of a drive.

4. Operation of Contents Distribution and Storage System

Figure 5:
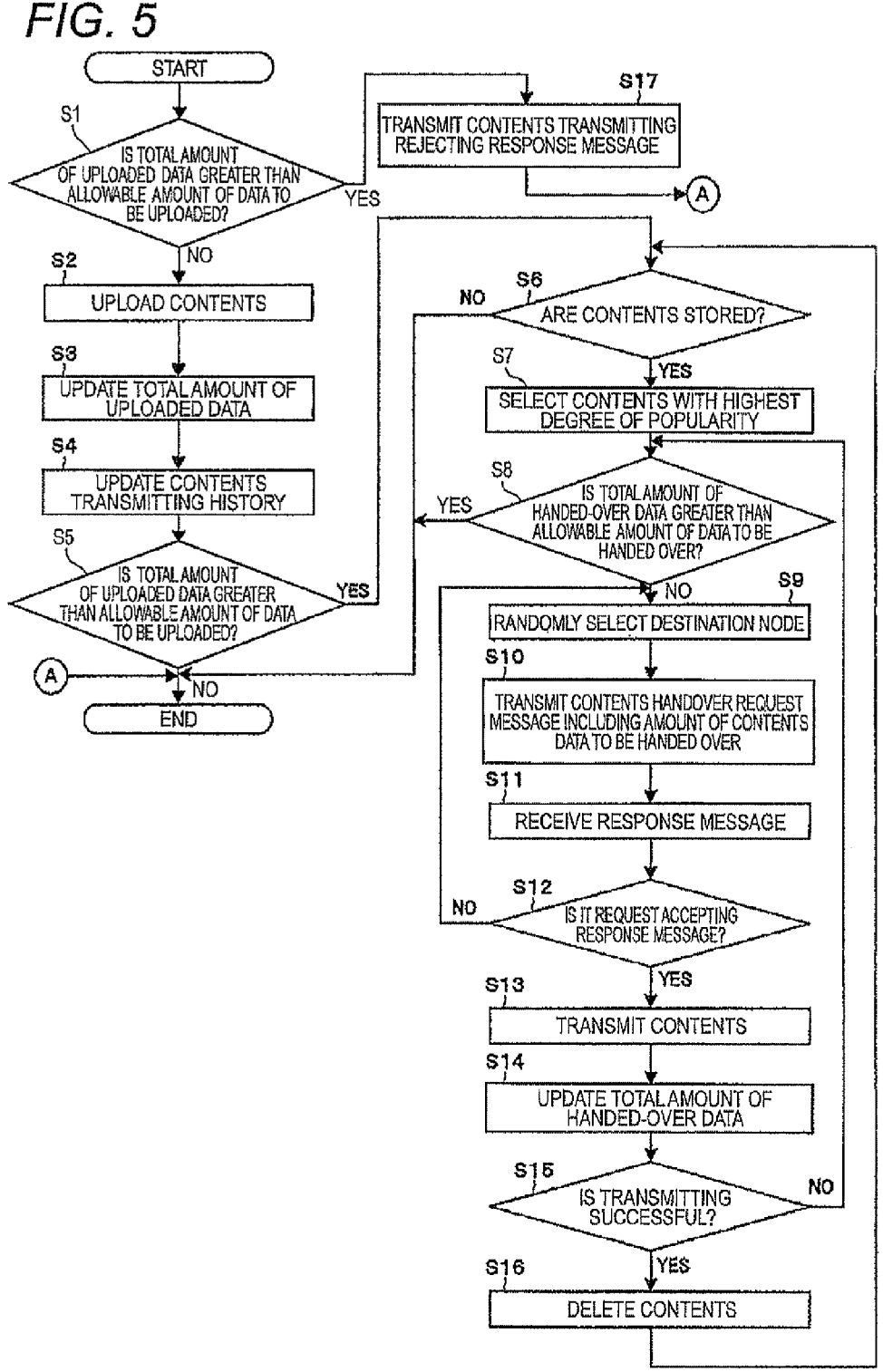
FIG. 5 is a flowchart illustrating the flow of a contents uploading and handover process in a node according to the first embodiment.

The operation of the contents distribution and storage system S according to the first embodiment will be described below with reference to FIGS. 5 and 6. FIG. 5 is a flowchart illustrating the flow of a contents uploading and handover process of a node in the first embodiment. In the flowchart shown in FIG. 5, it is assumed that contents having a high degree of popularity are preferentially selected as the contents to be handed over.

The contents uploading and handover process is started when a node receives a contents request message from another node. First, the control unit 21 serves as the determination unit and determines whether the total amount of uploaded data stored in the storage unit 22 is greater than the allowable amount of data to be uploaded (step S1). When it is determined that the total amount of uploaded data is not greater than the allowable amount of data to be uploaded (NO in step S1), the control unit 21 uploads contents stored in the storage unit 22 to the node having transmitted the contents request message (step S2). Subsequently, the control unit 21 serves as the acquisition unit and adds the amount of data of the uploaded contents to the current total amount of uploaded data to update the total amount of uploaded data (step S3).

Then, the control unit 21 serves as the recording unit and updates the contents transmitting history (step S4).

Subsequently, the control unit 21 serves as the determination unit and determines whether the total amount of uploaded data is greater than the allowable amount of data to be uploaded (step S5). When it is determined that the total amount of uploaded data is not greater than the allowable amount of data to be uploaded (NO in step S5), the control unit 21 ends the contents uploading and handover process.

When it is determined that the total amount of uploaded data is greater than the allowable amount of data to be uploaded (YES in step S5), the control unit 21 hands over contents. Specifically, the control unit 21 determines whether one or more pieces of contents are stored in the storage unit 22 (step S6). When it is determined that one or more pieces of contents are stored (YES in step S6), the control unit 21 selects contents having the highest degree of popularity from the stored contents as the contents to be handed over (step S7).

Subsequently, the control unit 21 determines whether the total amount of handed-over data which is the total sum of the amounts of data of the contents handed over at the current time is greater than the allowable amount of data to be handed over (step S8). When it is determined that the total amount of handed-over data is not greater than the allowable amount of data to be handed over (NO in step S8), the control unit 21 selects a handover destination node (step S9). Specifically, the control unit 21 randomly selects a handover destination node from the nodes whose node information is registered in the routing table. Then, the control unit 21 transmits a contents handover request message to the handover destination node (step S10). The contents handover request message includes the amount of data of the contents to be handed over.

Thereafter, the control unit 21 receives a response message from the handover destination node (step S11). The response message includes a request accepting response message indicating that the request for handing over the contents is accepted and a request rejecting response message indicating that the request for handing over the contents is rejected. Accordingly, the control unit 21 determines whether the received response message is the request accepting response message (step S12). When it is determined that the received response message is the request rejecting response message (NO in step S12), the control unit 21 performs the process of step S9. Then, the control unit 21 selects another node as the handover destination.

When it is determined that the received response message is the request accepting response message (YES in step S12), the control unit 21 transmits the contents to be handed over to the handover destination node (step S13). Subsequently, the control unit 21 adds the amount of data of the contents to be handed over to the total amount of handed-over data to update the total amount of handed-over data (step S14).

The control unit 21 determines whether the transmitting of the contents to be handed over is successful (step S15). For example, when the handover destination node normally receives the contents to be handed over, it is assumed that a notification message is transmitted to the node as a transmitting source of the contents to be handed over. In this case, when receiving the notification message before a predetermined time passes after the contents to be handed over is transmitted, the control unit 21 determines that the transmitting of the contents is successful (YES in step S15). In this case, the control unit 21 deletes the contents to be handed over from the storage unit 22 (step S16) and performs the process of step S6. By repeatedly performing the processes of steps S6 to S16, the contents are handed over in the order of decreasing a degree of popularity until the total amount of handed-over data is greater than the allowable amount of data to be handed over.

When not receiving the notification message until the predetermined time has passed since the contents being handed over is transmitted, the control unit 21 determines that the transmitting of the contents is not successful (NO in step S15). In this case, the control unit 21 performs the process of step S8. When the total amount of handed-over data is not greater than the allowable amount of data to be handed over, the control unit 21 selects another node as the handover destination.

When it is determined in step S6 that one or more pieces of contents are not stored in the storage unit 22 (NO in step S6) or when it is determined that the total amount of handed-over data is greater than the allowable amount of data to be handed over (YES in step S8), the control unit 21 ends the contents uploading and handover process.

When it is determined in step S1 that the total amount of uploaded data stored in the storage unit 22 is greater than the allowable amount of data to be uploaded (YES in step S1), the control unit 21 transmits the contents transmitting rejecting response message to the node having transmitted the contents request message (step S17). The control unit 21 ends the contents uploading and handover process after performing the process of step S17.

Figure 6:
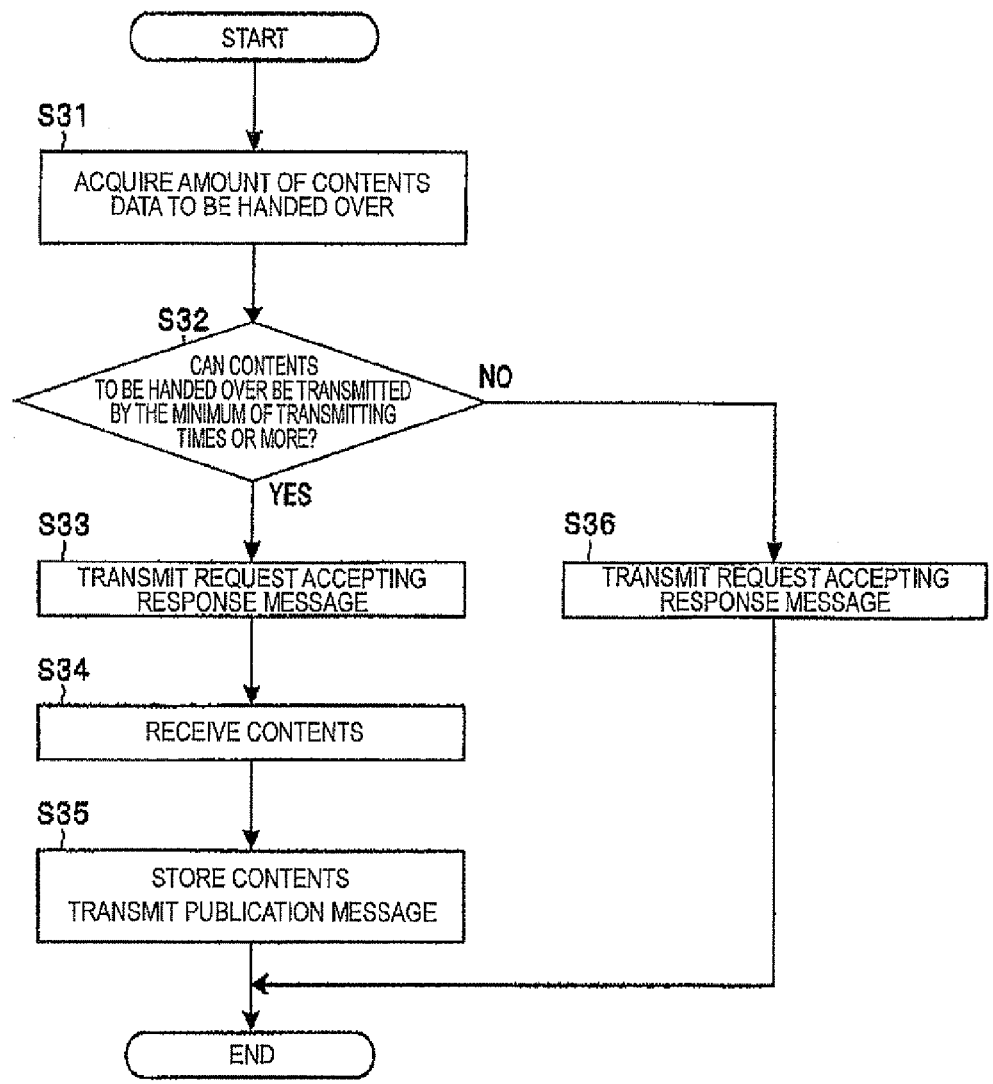
FIG. 6 is a flowchart illustrating the flow of a contents handover accepting process in a node according to the first embodiment.

FIG. 6 is a flowchart illustrating a contents handover accepting process of a node in the first embodiment. The contents handover accepting process is started when a node receives a contents handover request message from another node. First, the control unit 21 acquires the amount of data of the contents to be handed over from the received contents handover request message (step S31). Then, the control unit 21 determines whether the contents to be handed over can be transmitted by a minimum number of transmitting times or more (step S32). This is because when the handover destination node cannot upload the handed-over contents by a predetermined number of uploading times, the necessity for handing over the contents decreases. Here, the minimum number of transmitting times is stored, for example, in advance in the storage unit 22 as the condition for accepting the handover of contents. When the amount of data of the contents to be handed over satisfies the following expression, the control unit 21 determines whether the contents to be handed over can be transmitted by the minimum number of transmitting times or more (YES in step S32), $$\text{Total Amount of Uploaded Data at Current Time} + \text{Amount of data of Contents to be Handed Over} \times \text{Minimum of Transmitting Times} \leq \text{Allowable Amount of Data to be Uploaded}$$

In this case, the control unit 21 transmits the request accepting response message to the node having transmitting the contents handover request message (step S33). Thereafter, the control unit 21 receives the contents to be handed over which is transmitted from the node having transmitted the contents handover request message (step S34). The control unit 21 stores the received contents and transmits a publication message to the root node (step S35).

On the other hand, when the amount of data of the contents to be handed over does not satisfy the above-mentioned expression in step S32, the control unit 21 determines that the contents to be handed over cannot be transmitted by the minimum of transmitting times or more (NO in step S32). In this case, the control unit 21 transmits the request rejecting response message to the node having transmitted the contents handover request message (step S36), The control unit 21 ends the contents handover accepting process after performing the process of step S35 or S36.

According to the above-mentioned first embodiment, the control unit 21 acquires the total amount of uploaded data by which the contents are uploaded to another node for a counting period. The control unit 21 determines whether the acquired total amount of uploaded data is greater than the allowable amount of data to be uploaded. When it is determined that the total amount of uploaded data is greater than the allowable amount of data to be uploaded, the control unit 21 inhibits the uploading of the contents stored in the storage unit 12 to another node. Accordingly, it is possible to prevent a specific node from excessively transmitting contents.

When it is determined that the total amount of uploaded data is greater than the allowable amount of data to be uploaded, the control unit 21 inhibits the uploading of the contents stored in the storage unit 22 to another node and permits the downloading of contents. Accordingly, a node can acquire necessary contents even after the uploading of contents is inhibited.

Before inhibiting the uploading of contents when the total amount of uploaded data is greater than the allowable amount of data to be uploaded, the control unit 21 transmits at least one piece of contents stored in the storage unit 22 as the contents to be handed over to another node. The control unit 21 receives the contents to be handed over from another node and stores the received contents in the storage unit 22. The control unit 21 transmits the publication message of the stored contents to be handed over. Therefore, another node instead of the node whose the uploading of contents is inhibited can upload the contents. As a result, it is possible to distribute the uploading load to the nodes and to transmit the contents without reducing the number of nodes uploading the contents due to the inhibition of the uploading.

In this case, the control unit 21 may transmit the contents belonging to a predetermined type as the contents to be handed over. The control unit 21 may acquire the degree of popularity of contents set in advance for each content and preferentially transmit the contents having a higher degree of popularity. The control unit 21 may record a contents transmitting history and preferentially transmit the contents having a higher uploading frequency on the basis of the contents transmitting history. The control unit 21 may preferentially transmit the contents having the newest uploading time. The control unit 21 may preferentially transmit the contents having a larger amount of data. In this case, it is possible to effectively distribute the uploading load to the nodes.

The control unit 21 deletes the contents, which are transmitted as the contents to be handed over to another node, from the storage unit 22. Therefore, it is possible to distribute the uploading load to the nodes and to prevent the total amount of uploaded data from increasing in the node in which the inhibition of the uploading has been released, after the inhibition of the uploading of contents is released.

In the above-mentioned embodiment, the peer-to-peer network using DHT is applied to the overlay network, but the invention is not limited to this application. For example, another peer-to-peer system or a system using an overlay network may be applied. An example of the peer-to-peer system not using DHT is a hybrid peer-to-peer system.

Second Embodiment

Hereinafter, a second embodiment will be described with reference to FIGS. 7 to 9.

5. Configuration and Operation of Contents Distribution and Storage System

The configuration and operation of a contents distribution and storage system according to the second embodiment are the same as the first embodiment and thus are not described below.

6. Limitation (2) of Amount of Contents Data to be Uploaded

The contents distribution and storage system S is configured so that each node does not excessively upload contents to another node. More specifically, a contents holding node, whose a data uploadable amount for a counting period is equal to or greater than a first threshold value, is controlled to upload contents.

The data uploadable amount is an amount of data indicating capacity how much the node can upload the contents within the counting period. The data uploadable amount is a value obtained by subtracting the total amount of uploaded data for the counting period from the allowable amount of data to be uploaded for each counting period. The first threshold value may be set in advance to a single value all over the system or may be set in advance to values different by content. The total amount of uploaded data is the total sum of the amounts of data by which contents are uploaded to another node. The allowable amount of data to be uploaded is set in advance, for example, by nodes. For example, when an absolute upper limit by which contents data should not be uploaded is set, the allowable amount of data to be uploaded is set to a value smaller than the absolute upper limit. The counting period is a period as a unit period in calculating the data uploadable amount. The total sum of the amounts of data uploaded for a certain counting period is the total amount of uploaded data for the counting period. The counting period may be set in advance, for example, to a single value all over the system or to values by content.

The data uploadable amount of each node is stored in correlation with the index information of a contents holding node in the root node for every contents. The total sum of the data uploadable amounts for each contents is information indicating the total data uploadable amount in the contents distribution and storage system S as a whole. The contents holding node uploading contents is determined on the basis of the node information and the data uploadable amount, which are included in the index information stored in the root node. The data uploadable amount is included together with the node information in the publication message transmitted from the contents holding node.

Figure 7:
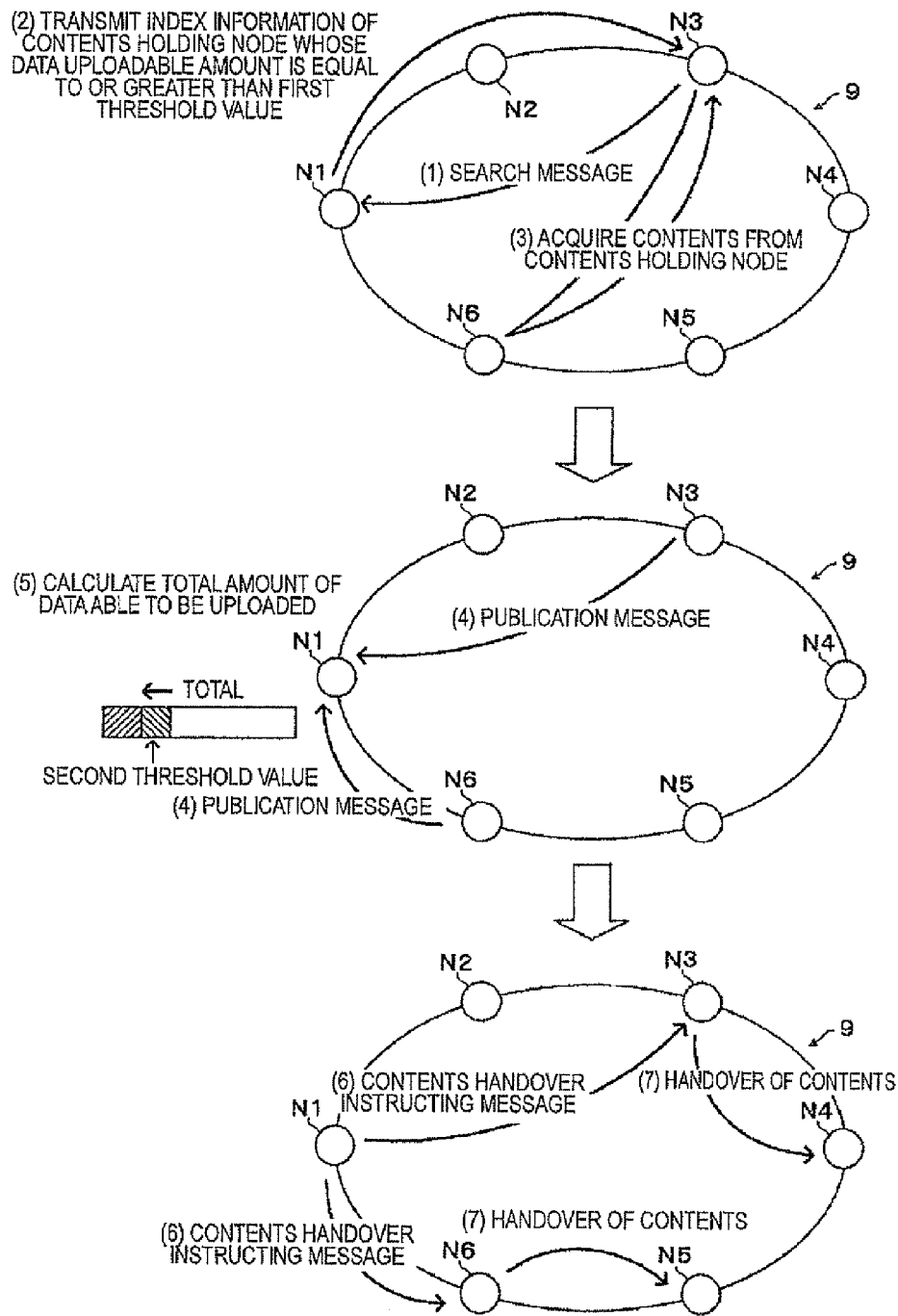
FIG. 7 is a diagram schematically illustrating operations in a contents distribution and storage system S according to a second embodiment.

Specifically, as shown in FIG. 7, for example, node N3 as a user node transmits a search message to, for example, node N1 which is the root node of the contents to be downloaded (see (1) of FIG. 7). Node N1 receiving the search message determines a predetermined number of index information pieces whose the corresponding data uploadable amount is equal to or greater than the first threshold value, from the index information corresponding to the contents ID included in the search message. Node N1 transmits the determined index information to node N3 (see (2) of FIG. 7). Node N3 receiving the index information selects one piece of index information from the received index information. Node N3 downloads the contents from the contents holding node indicated by the selected index information, for example, node N6 (see (3) of FIG. 7).

Each node transmits the publication messages of the contents stored therein, for example, periodically. For example, nodes N3 and N6 which are the contents holding nodes of certain contents transmit the publication messages (see (4) of FIG. 7). The publication messages include the data uploadable amounts of the contents holding nodes at that time. The publication messages are received, for example, by node N1 as the root node. Then, the node changes the data uploadable amounts, which are stored in correlation with the index information of nodes N3 and N6, to the data uploadable amounts, which are included in the received publication messages.

Node N1 calculates the total sum of the data uploadable amounts for each contents, for example, periodically (see (5) of FIG. 7). When the calculated total sum is equal to or less than a second threshold value which is a predetermined threshold value, node N1 instructs to hand over contents. The handover of contents means that the number of contents holding nodes capable of uploading target contents increases. The handover of contents is carried out by transmitting and storing the target contents to and in another node. The second threshold value may be set in advance, for example, to a single value all over the system or to values by content. When it is instructed to hand over contents, node N1 transmits a contents handover instructing message to the contents holding nodes (see (6) of FIG. 7). The contents handover instructing message includes the contents IDs of the contents, whose the total data uploadable amount is equal to or less than the second threshold value, as the contents to be handed over.

Node N3 receiving the contents handover instructing message transmits the contents to be handed over to, for example, node N4. Node N6 receiving the contents handover instructing message transmits the contents to be handed over to, for example, node N5 (see (7) of Fig. 7). Thereafter, the publication messages are transmitted to node N1 from nodes N4 and N5 serving as the contents holding nodes. Therefore, the total sum of the index information and the data uploadable amounts, which are stored in node N1, increases. The total data uploadable amount also increases.

When the counting period passes, a new counting period is started. Then, the node resets the total amount of uploaded data to zero. Accordingly, the data uploadable amount increases. At this time, the node may transmit the publication message.

7. Configuration of Node

The electrical configuration of a node in the second embodiment is substantially the same as the first embodiment and thus only differences will be described below. In the second embodiment, the index information and the data uploadable amount are correlated with each other and stored in the storage unit 22. In the second embodiment, information such as the allowable amount of data to be uploaded, the total amount of uploaded data at the current time, the first threshold value, the second threshold value, and the contents transmitting history is stored in the storage unit 22.

8. Operation of Contents Distribution and Storage System

The operation of the contents distribution and storage system S according to the second embodiment will be described below with reference to FIGS. 8 and 9. FIGS. 8 and 9 are flowcharts illustrating the flow of processes in a node in the second embodiment. In FIGS. 8 and 9, the processes not required for describing the second embodiment are not shown.

Figure 8:
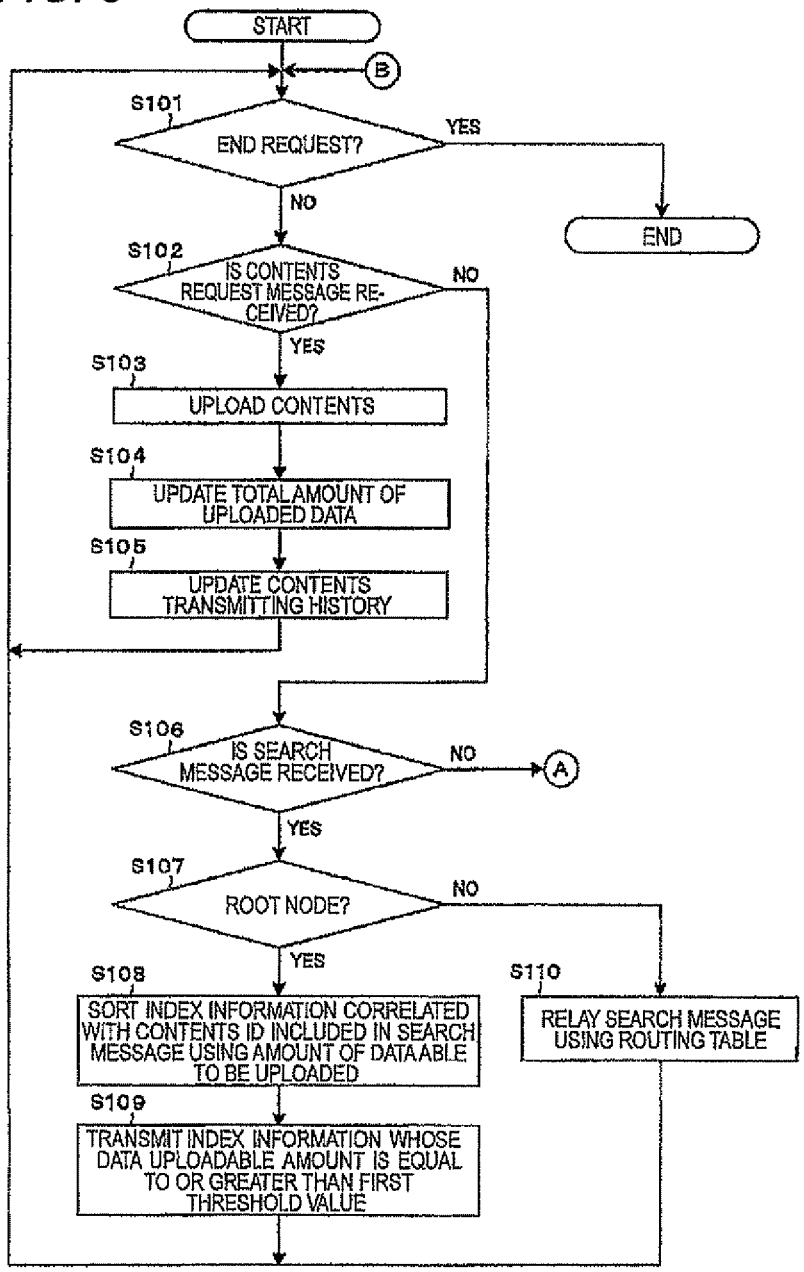
FIG. 8 is a flowchart illustrating the flow of processes in a node according to the second embodiment.

The flow of processes shown in FIG. 8 is started, for example, when a user causes a node to execute the P2P software. First, the control unit 21 determines whether a request for ending the P2P software is given by the user's operation (step S101). When it is determined that the request for ending is not given (NO in step S101), the control unit 21 determines whether a contents request message is received from another node (step S102). When it is determined that a contents request message is received (YES in step S102), the control unit 21 uploads the contents stored in the storage unit 22 to the node having transmitted the contents request message (step S103). Subsequently, the control unit 21 adds the amount of data of the uploaded contents to the current total amount of uploaded data to update the total amount of uploaded data (step S104). Then, the control unit 21 updates the contents transmitting history (step S105). For example, the control unit 21 records the contents ID of the uploaded contents and the current time in the contents transmitting history stored in the storage unit 22. The control unit 21 performs the process of step S101 after performing the process of step S105.

When it is determined in step S102 that the contents request message is not received (NO in step S102), the control unit 21 determines whether a search message is received from another node (step S106). When it is determined that the search message is received (YES in step S106), the control unit 21 determines whether the node itself is the root node of the contents indicated by the contents ID included in the received search message (step S107). When it is determined that the node itself is the root node (YES in step S107), the control unit 21 sorts the index information stored in the storage unit 22 (step S108). Specifically, the control unit 21 sorts the index information corresponding to the contents ID included in the received search message in the order of decreasing the data uploadable amount, which is stored in the storage unit 22 in correlation with each other. Then, the control unit 21 selects a predetermined number of index information pieces whose the data uploadable amount is equal to or greater than the first threshold value from the sorted index information. When there is not the predetermined number of index information pieces whose the data uploadable amount is equal to or greater than the first threshold value, all the index information pieces whose the data uploadable amount is equal to or greater than the first threshold value are selected. Then, the control unit 21 transmits the selected index information to the node having transmitted the search message (step S109). The control unit 21 performs the process of step S101 again after performing the process of step S109.

When it is determined in step S107 that the node itself is not the root node (NO in step S107), the control unit 21 relays the search message to another node using the routing table (step S110). The control unit 21 performs the process of step S101 again after performing the process of step S109.

When it is determined in step S106 that the search message is not received (NO in step S106), the control unit 21 determines whether it is time to transmit the publication messages of all the contents stored in the storage unit 22 (step S111), as shown in FIG. 6. For example, when a predetermined time passes after transmitting the previous publication message, the control unit 21 determines that it is time to transmit the publication message (YES in step S111). In this case, the control unit 21 calculates the data uploadable amount at the current time (step S112). Specifically, the control unit 21 calculates the following expression.

Data uploadable amount=Allowable amount of Data to be Uploaded−Total amount of Uploaded Data Subsequently, the control unit 21 selects one piece of contents from the contents stored in the storage unit 22 (step S113). Then, the control unit 21 transmits the publication message of the selected contents to the root node of the contents (step S114). At this time, the control unit 21 adds the contents ID of the selected contents, the node information of the node, and the data uploadable amount to the publication message. Then, the control unit 21 waits for a predetermined time (step S115).

Subsequently, the control unit 21 determines whether all the contents stored in the storage unit 22 are selected (step S116). When it is determined that all the contents are not selected (NO in step S116), the control unit 21 selects one piece of contents from the non-selected contents (step S117). Then, the control unit 21 performs the process of step S114. When it is determined that all the contents stored in the storage unit 22 are selected (YES in step S116), the control unit 21 performs the process of step S101 again.

When the predetermined time does not pass yet after transmitting the previous publication message, the control unit 21 determines that it is not time to transmit the publication message in step S111 (NO in step S111). In this case, the control unit 21 determines whether it is time to instruct the handover of contents (step S118). For example, when a predetermined time passes after instructing to hand over the previous contents, the control unit 21 determines that it is time to instruct the handover of contents (YES in step S118). In this case, the control unit 21 selects one piece of contents from the contents managed by the node itself as the root node (step S119). Then, the control unit 21 calculates the total sum of the data uploadable amounts, which are stored in the storage unit 22 in correlation with the contents ID of the selected contents (step S120). Subsequently, the control unit 21 determines whether the calculated total sum is equal to or less than the second threshold value (step S121). When it is determined that the calculate total sum is equal to or less than the second threshold value (YES in step S121), the control unit 21 transmits the contents handover instructing messages to all the contents holding nodes of the selected contents (step S122). At this time, the control unit 21 adds the contents ID of the selected contents to the contents handover instructing message. The nodes having received the contents handover instructing message transmit the contents corresponding to the contents ID included in the contents handover instructing message to other nodes. For example, each node randomly selects a handover destination node from the nodes whose the node information is set in the routing table. Then, the node transmits the contents to be handed over to the selected handover destination node. Then, the node having received the contents stores the received contents in the storage unit 22 and transmits the publication message.

Subsequently, the control unit 21 determines whether all the contents managed by the node itself as the root node are selected (step S123). When it is determined in step S121 that the calculated total sum is greater than the second threshold value (NO in step S121) or when it is determined in step S123 that all the contents are not selected (NO in step S123), the control unit 21 selects one piece of contents from the non-selected contents (step S124). Then, the control unit 21 performs the process of step S120.

When it is determined in step S123 that all the contents managed by the node itself as the root node are selected (YES in step S123), the control unit 21 performs the process of step S101 again.

When the predetermined time does not pass yet after instructing to hand over the previous contents, the control unit 21 determines that it is not time to instruct the handover of the previous contents in step S118 (NO in step S118). In this case, the control unit 21 performs the process of step S101 again.

Figure 9:
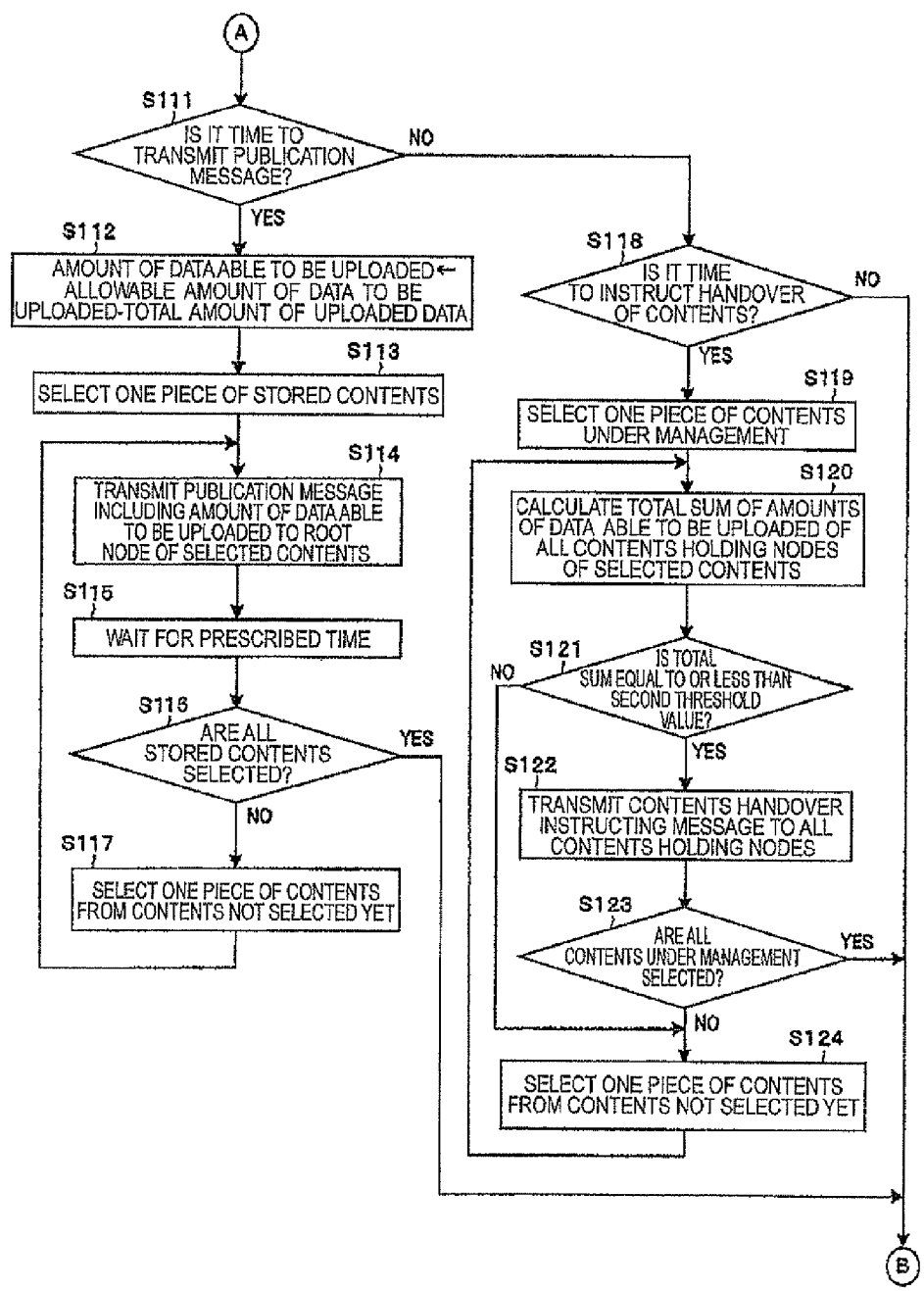
FIG. 9 is a flowchart illustrating the flow of processes in a node according to the second embodiment.

When it is determined in step S101 that the request for ending is given (YES in step S101), the control unit 21 ends the flow of processes shown in FIGS. 8 and 9.

According to the above-mentioned second embodiment, the root node stores the index information including the node information of the contents holding nodes in the storage unit 22. The storage unit 22 of the root node stores the data uploadable amounts of the contents holding nodes in correlation with the index information thereof all over the contents distribution and storage system S. The user node acquires the contents from the contents holding node whose data uploadable amount, which is stored in the root node, is equal to or greater than a unit threshold value. Accordingly the root node can manage the data uploadable amount of contents in the contents distribution and storage system S. As a result, the user node can acquire the contents from the contents holding node having an enough data uploadable amount. Therefore, it is possible to prevent a specific node from transmitting contents excessively.

The storage unit 22 of the root node stores the index information in correlation with the data uploadable amount for each contents. Accordingly, the root node can manage the data uploadable amount of contents for each contents.

The root node correlates and stores the index information included in the received publication message and the data uploadable amount with correlated each other in the storage unit 22. Accordingly, the root node can manage the degree how much amount of contents can be uploaded to a node by the nodes. As a result, it is possible to distribute the degree how much amount of contents can be uploaded to plural nodes.

The root node determines the index information in which the corresponding data uploadable amount is equal to or greater than the first threshold value from the index information stored in the storage unit 22 in correlation with the contents ID included in the search message received from the user node and transmits the determined index information to the user node. The user node acquires the contents from the contents holding node indicated by the received index information. Accordingly, it is possible to determine the contents holding node to upload the contents on the basis of the data uploadable amount, which is transmitted along with the publication message. The root node can determine the contents holding node having an enough data uploadable amount as the source of the contents.

The root node determines whether the total sum of the data uploadable amounts, which are stored in the storage unit 22, is equal to or less than the second threshold value. The root node transmits the handover instructing message including the contents ID of the contents, whose the total sum of the data uploadable amounts is determined as being equal to or less than the second threshold value, to the contents holding nodes of the contents. Each of the contents holding nodes acquires the contents indicated by the contents ID included in the received handover instructing message from the storage unit 22 and transmits the acquired contents to another node. The node having received the contents from the contents holding node stores the received contents and thus serves as a new contents holding node of the contents. Accordingly, the number of contents holding nodes capable of uploading the contents whose uploadable data amount is lowered increases. Therefore, as in the contents distribution and storage system S, it is possible to raise uploadable data amount of contents.

Since the contents holding nodes periodically transmit the publication message, it is possible to satisfactorily reflect the actual data uploadable amount of the contents holding node in the amount of data able to be uploaded, which is stored in the root node.

In the second embodiment, when a user node downloads contents, the root node determines the contents holding nodes whose the data uploadable amount is equal to or greater than the first threshold value. However, the user node may perform the determination. For example, when the root node receives a search message, the root node correlates the data uploadable amount with the index information corresponding to the contents ID included in the search message and transmits the correlated set to the user node. The user node having received the index information and the data uploadable amount determines the index information whose the data uploadable amount is equal to or greater than the unit threshold value. Then, the user node downloads the contents from the contents holding node indicated by one piece of index information out of the determined index information.

In the second embodiment, a node adds the data uploadable amount to a publication message at the time of transmitting the publication message by nodes. However, information indicating whether there is an enough capacity for transmitting contents may be added to the publication message. For example, a node adds flag information indicating whether contents can be uploaded at the current time to the publication message. In this case, when the data uploadable amount is equal to or greater than the first threshold value, the node transmits the publication message including the flag information indicating that the uploading is possible. On the other hand, when the data uploadable amount is less than the first threshold value, the node transmits the publication message including the flag information indicating that the uploading is impossible. The root node having received the publication message stores the node information and the contents ID included in the publication message in the storage unit 22 as the index information, and also stores the flag information included in the publication message in the storage unit 22.

When the flag information is included in the publication message, the node determining the contents holding nodes whose data uploadable amount is equal to or greater than the first threshold value may be a root node or a user node. When the root node performs the determination, the root node selects the index information whose corresponding flag information indicates that the uploading is possible from the index information corresponding to the contents ID included in the received search message. Then, the root node transmits the selected index information to the user node. On the other hand, when the user node performs the determination, the root node correlates the flag information with the index information corresponding to the contents ID included in the received search message and transmits the correlated set to the user node. The user node having received the index information and the flag information selects the index information whose corresponding flag information indicates that the uploading is possible. Then, the user node downloads the contents from the contents holding node indicated by one piece of index information out of the selected index information.

When the flag information is included in the publication message, the method of determining the contents to be handed over by the use of the root node is different from that in the case where the data uploadable amount is used. For example, the root node calculates the total number of flag information pieces which indicates that the uploading is possible and are stored in the storage unit 22 in correlation with the contents ID of the contents of interest. The total number is information indicating the data uploadable amount of contents in the contents distribution and storage system S as a whole. When the calculated total number is equal to or less than a predetermined value, the root node instructs to hand over the contents of interest. That is, when the number of contents holding nodes capable of uploading the contents is equal to or less than a predetermined value, the handover of the contents is performed.

In the second embodiment, each node transmits the publication message periodically in addition to the time when the contents are downloaded and stored. However, the publication message may be transmitted at a time other than the periodic times. For example, the node calculates the data uploadable amount at the time of uploading the contents. The node may transmit the publication message at the time of uploading the contents. In this case, when the data uploadable amount varies, the publication message including the newest data uploadable amount is transmitted. Accordingly, it is possible to satisfactorily reflect the current situation in the data uploadable amount which is stored in the root node. When the data uploadable amount is less than the unit threshold value, the node Nn may transmit the publication message. In this case, it is possible to reduce the publication message to be transmitted.

In the second embodiment, the peer-to-peer network using DHT is applied to the overlay network, but the invention is not limited to this application. For example, another peer-to-peer system or a system using an overlay network may be applied. An example of the peer-to-peer system not using DHT is a hybrid peer-to-peer system. In the hybrid peer-to-peer system, a predetermined server device manages the index information of all contents. In this case, the server device can be employed as the information processing apparatus of the invention.

According to the embodiments, the following arrangements are provided: A node device in an information communications system for an overlay network, the information communications system including a plurality of node devices which are connected to each other through a network and constitute the overlay network, contents being distributed and stored in the plurality of node devices, the plurality of node devices including a contents source transmitting contents to other node devices, the node device may comprises a contents storage unit configured to store the contents; and a limiting unit configured to limit uploading of the contents stored in the contents storage unit. And the node device may further comprises a transmitting unit configured to transmit at least one piece of contents stored in the contents storage unit to another node device before the limiting unit limits the uploading of the contents if the total amount of data acquired by the first acquisition unit is greater than the threshold.

The node device according to described above, the contents storage unit may store the contents in correlation with a predetermined type of contents, and the transmitting unit may transmit the contents belonging to the predetermined type selected from the contents stored in the storage unit.

The node device according to described above may further comprise a third acquisition unit configured to acquire a degree of popularity of the contents for every contents, and the transmitting unit preferentially may transmit the contents with the higher degree of popularity acquired by the third acquisition unit.

The node device according to described above may further comprise a recording unit configured to record frequency information indicating an uploading frequency of the contents uploaded to other node devices for every contents, and the transmitting unit preferentially may transmit the contents with the higher uploading frequency recorded by the recording unit.

The node device according to described above, the storage unit may store a transmitting time when contents are transmitted to another node device and the contents in correlation, and the transmitting unit preferentially may transmit the contents whose the transmitting time is closer to the current time and which are stored in the storage unit.

The node device according to described above, the transmitting unit preferentially may transmit the contents which has a large amount of data and is stored in the storage unit.

The node device according to described above may further comprise a second acquisition unit configured to download and acquire the contents from another node device, and if the determination unit determines that the total amount of data is greater than the threshold, the limiting unit limits the uploading of the contents stored in the contents storage unit to another node device and permits the second acquisition unit to download the contents. And The node device may further comprise a deletion unit configured to delete the contents, transmitted by the transmitting unit, from the storage unit.

What is claimed is:

1. An information communications system for an overlay network comprising:
a plurality of node devices which are configured to be connected to each other through a network and constitute the overlay network, contents being distributed and stored in the plurality of node devices, the plurality of node devices including a contents source transmitting contents to other node devices, each of the plurality of node devices comprising a memory that stores instructions and a processor that executes the instructions, wherein the plurality of node devices includes a first node device, the processor of the first node device being configured to store the contents and being configured to limit uploading of the contents, and
an information processing apparatus comprising a memory that stores instructions and a processor that executes the instructions, the processor of the information processing apparatus being configured to:
store location information indicating a location, in the network, of a contents holding node device and first information indicating a data uploadable amount of the contents by which the contents holding node device whose location is indicated by the location information can upload the contents, the location information and the first information being correlated with each other, the data uploadable amount indicating an amount of data which can be uploaded within a predetermined period and being determined based on an allowable amount of data to be uploaded for the predetermined period and a total amount of data which has been uploaded to another node within the predetermined period,
determine location information of a contents holding node device whose data uploadable amount is equal to or greater than a threshold and whose location is indicated by the location information on the basis of the first information; and
transmit the determined location information of the contents holding node device to the first node device of the plurality of node devices,
wherein the processor of the first node device is configured to:
receive the location information transmitted from the information processing apparatus,
acquire the contents from the contents holding node device whose data uploadable amount is equal to or greater than the threshold on the basis of the first information, the location of the contents holding node device being indicated by the location information.

2. The information communications system according to claim 1, wherein the processor of the information processing apparatus is further configured to transmit the location information and the stored first information to the first node device, wherein the processor of the first node device is further configured to:
receive the location information and the first information transmitted from the information processing apparatus; and
determine the contents holding node device whose data uploadable amount is equal to or greater than the threshold and whose location is indicated by the location information on the basis of the received first information, and
wherein the processor of the first node device is configured to acquire the contents from the determined contents holding node device.

3. The information communications system according to claim 1, wherein the processor of the first node device is further configured to:
transmit, to the information processing apparatus, a publication message, which indicates publication of the contents and includes the location information of the first node device and second information indicating the data uploadable amount based on the amount of data uploaded by the node device,
wherein the processor of the information processing apparatus is configured to:
store the location information and the first information for each contents in correlation with each other;
receive the publication message transmitted from the first node device; and
update the first information in correlation with the location information included in the received publication message on the basis of the second information included in the received publication message.

4. The information communications system according to claim 3, wherein the processor of the information processing apparatus is configured to store the location information and the second information in correlation with identification information of the contents,
wherein the processor of the information processing apparatus is further configured to:
receive an inquiry message including the identification information from the first node device;
determine the location information of the contents holding node device whose data uploadable amount is equal to or greater than the threshold from the location information on the basis of the second information in correlation with the identification information included in the inquiry message received by the information processing apparatus; and
transmit the determined location information to the first node device,
wherein the processor of the first node device is further configured to:
transmit the inquiry message including the identification information of the contents to be acquired; and
receive the location information transmitted from the information processing apparatus, and
wherein the processor of the first node device is configured to acquire the contents from the contents holding node device whose location is indicated by the received location information.

5. The information communications system according to claim 3, wherein the processor of the information processing apparatus stores the location information and the second information in correlation with identification information of the contents,
wherein the processor of the information processing apparatus is further configured to:
receive an inquiry message including the identification information from the node device; and
transmit, to the first node device, the location information and the second information, which are correlated with the identification information included in the received inquiry message, wherein the processor of the first node device is further configured to:
transmit the inquiry message including the identification information of the contents to be acquired;
receive the location information and the second information transmitted from the information processing apparatus; and
determine the location information of the contents holding node device whose data uploadable amount is equal to or greater than the threshold from the received location information on the basis of the received second information, and
wherein the processor of the first node device acquires the contents from the contents holding node device whose the location is indicated by the determined location information.

6. The information communications system according to claim 3, wherein the processor of the information processing apparatus is further configured to:
determine whether data transmittable amount of contents indicated by the first information is equal to or less than a threshold; and
transmit a transmitting instructing message, which includes the identification information of the contents whose data transmittable amount is be equal to or less than the threshold, to the contents holding node device whose the location is indicated by the location information in correlation with the contents,
wherein the processor of the first node device is further configured to:
receive the transmitting instructing message transmitted from the information processing apparatus; and
acquire the contents indicated by the identification information included in the received transmitting instructing message and transmit the acquired contents to another node device.

7. The information communications system according to claim 3, wherein in response to determining the contents are uploaded to another node device, the processor of the first node device transmits the publication message of the uploaded contents.

8. The information communications system according to claim 3, wherein in response to the data uploadable amount of the contents at a current time is less than the threshold, the processor of the first node device transmits the publication message of the contents whose data uploadable amount is less than the threshold.

9. The information communications system according to claim 3, wherein
the information communications system distributes and stores contents in the overlay network including the plurality of node devices, and
the information processing apparatus is a node device of the plurality of node devices included in the overlay network and is a root node determined by contents.

10. A node device in an information communications system for an overlay network, the information communications system including a plurality of node devices which are configured to be connected to each other through a network and are configured to constitute the overlay network, contents being distributed and stored in the plurality of node devices, the plurality of node devices including a contents source transmitting contents to other node devices, the information communications system including an information processing apparatus, the node device being one of the plurality of node devices,
the node device comprising:
a memory that stores instructions, and
a processor that is configured to execute the instructions to:
receive the location information transmitted from the information processing apparatus,
acquire the contents from the contents holding node device whose data uploadable amount is equal to or greater than the threshold, the location of the contents holding node device being indicated by the location information, the data uploadable amount indicating an amount of data which can be uploaded within a predetermined period and being determined based on an allowable amount of data to be uploaded for the predetermined period and a total amount of data which has been uploaded to another node within the predetermined period,
acquire the total amount of data by which the contents are uploaded to the other node device for the predetermined period;
determine whether the total amount of data acquired is greater than a threshold, and
limit the node device from uploading the contents to other node devices, in response to determining that the total amount of data is greater than the threshold.

11. The node device according to claim 10, the processor of the node device is further configured to download and acquire the contents from another node device,
wherein in response to determining that the total amount of data is greater than the threshold, the processor of the node device is configured to allow download the contents.

12. The node device according to claim 10, the processor of the node device is further configured to transmit at least one piece of stored contents to another node device before the limiting the uploading of the contents in response to determining the total amount of acquired data is greater than the threshold.

13. The node device according to claim 12, the processor of the node device is further configured to:
receive the contents transmitted by another node device;
store the received contents ; and
allow other node devices to acquire the stored contents through the overlay network,
wherein the processor of the node device transmits at least one piece of contents to another node device.

14. A method of communicating contents which are distributed and stored in a plurality of node devices which are connected to each other and constitutes an overlay network, the contents being transmitted among the plurality of node devise, the method comprising:
storing location information indicating a location, in the network, of a contents holding node device and first information indicating a data uploadable amount of the contents by which the contents holding node device whose location is indicated by the location information can upload the contents, the location information and the first information being correlated with each other, the data uploadable amount indicating an amount of data which can be uploaded within a predetermined period and being determined based on an allowable amount of data to be uploaded for the predetermined period and a total amount of data which has been uploaded to another node within the predetermined period the step being performed by an information processing apparatus;
determining location information of a contents holding node device whose data uploadable amount is equal to or greater than a threshold and whose location is indicated by the location information on the basis of the first information, the step being performed by an information processing apparatus; and transmitting the determined location information of the contents holding node device to the one of the plurality of node devices, the step being performed by an information processing apparatus; and receiving the location information transmitted from the information processing apparatus, the step being performed by the one of the plurality of node devices, acquiring the contents from the contents holding node device whose data uploadable amount is equal to or greater than the threshold on the basis of the first information, the location of the contents holding node device being indicated by the location information, the step being performed by the one of the plurality of node devices.

15. A non-transitory computer readable recording medium storing a program for an information communications system for an overlay network, the information communications system including (a) a plurality of node devices and (b) an information processing apparatus, which are connected to each other through a network and constitute the overlay network, contents being distributed and stored in the plurality of node devices, the plurality of node devices including a contents source transmitting contents to other node devices, the program comprising:

instructions for the information processing apparatus to perform:

storing location information indicating a location, in the network, of a contents holding node device and first information indicating a data uploadable amount of the contents by which the contents holding node device whose location is indicated by the location information can upload the contents, the location information and the first information being correlated with each other, the data uploadable amount indicating an amount of data which can be uploaded within a predetermined period and being determined based on an allowable amount of data to be uploaded for the predetermined period and a total amount of data which has been uploaded to another node within the predetermined period, determining location information of a contents holding node device whose data uploadable amount is equal to or greater than a threshold and whose location is indicated by the location information on the basis of the first information; and transmitting the determined location information of the contents holding node device determined to the one of the plurality of node devices, and instructions for one of the plurality of node devices to perform:

receiving the location information transmitted from the information processing apparatus, acquiring the contents from the contents holding node device whose data uploadable amount is equal to or greater than the threshold on the basis of the first information, the location of the contents holding node device being indicated by the location information.

16. The node device according to claim 10,
wherein the processor of the node device is further configured to:
transmit, to the information processing apparatus, a publication message, which indicates publication of the contents and includes the location information of the first node device and second information indicating the data uploadable amount based on the amount of data uploaded by the node device.

17. The method according to claim 14,
wherein the one of the plurality of node devices perform further performs:
transmitting, to the information processing apparatus, a publication message, which indicates publication of the contents and includes the location information of the first node device and second information indicating the data uploadable amount based on the amount of data uploaded by the node device,
wherein the information processing apparatus further performs:
storing the location information and the first information for each contents in correlation with each other;
receiving the publication message transmitted from the first node device; and
updating the first information in correlation with the location information included in the received publication message on the basis of the second information included in the received publication message.

18. The non-transitory computer readable recording medium according to claim 15, the program further comprises:
instructions for the one of the plurality of node devices to perform:
transmitting, to the information processing apparatus, a publication message, which indicates publication of the contents and includes the location information of the first node device and second information indicating the data uploadable amount based on the amount of data uploaded by the node device, and
instructions for the information processing apparatus to perform:
storing the location information and the first information for each contents in correlation with each other;
receiving the publication message transmitted from the first node device; and
updating the first information in correlation with the location information included in the received publication message on the basis of the second information included in the received publication message.

* * * * *